United States Patent

[11] 3,577,794

| [72] | Inventor | Franklin W. Kerfoot, Jr.<br>678 Andover Road, Newton Square, Pa. 19073 |
|---|---|---|
| [21] | Appl. No. | 737,541 |
| [22] | Filed | June 17, 1968 |
| [45] | Patented | May 4, 1971 |

[54] LAMINATED SPROCKET BELT
7 Claims, 10 Drawing Figs.

[52] U.S. Cl. .................................................. 74/232, 74/237
[51] Int. Cl. .................................................. F16g 1/26
[50] Field of Search ........................................... 74/231, 232, 237

[56] References Cited
UNITED STATES PATENTS

| 469,778 | 3/1892 | D'Humy | 74/237 |
| 1,113,438 | 10/1914 | Hess | 74/237 |
| 2,318,287 | 5/1943 | Brolin | 74/231UX |
| 2,547,220 | 4/1951 | Merrill | 74/232 |
| 2,899,242 | 8/1959 | Bombardier | 74/237 |
| 2,932,340 | 4/1960 | Poeschl | 74/232 |

*Primary Examiner*—Milton Kaufman
*Attorneys*—Nelson E. Kimmelman and Maleson, Kimmelman & Ratner

ABSTRACT: An endless belt for driving sprocket wheels is made of a plurality of layers, each layer having a butt joint which is spaced longitudinally of the belt from the joint of other layers. In one form the length of the joint is at least twice the width of the belt. The joints pass between adjacent ones of the sprocket holes. Other forms include reinforcing bands and belts which are thicker in the region between sprocket holes.

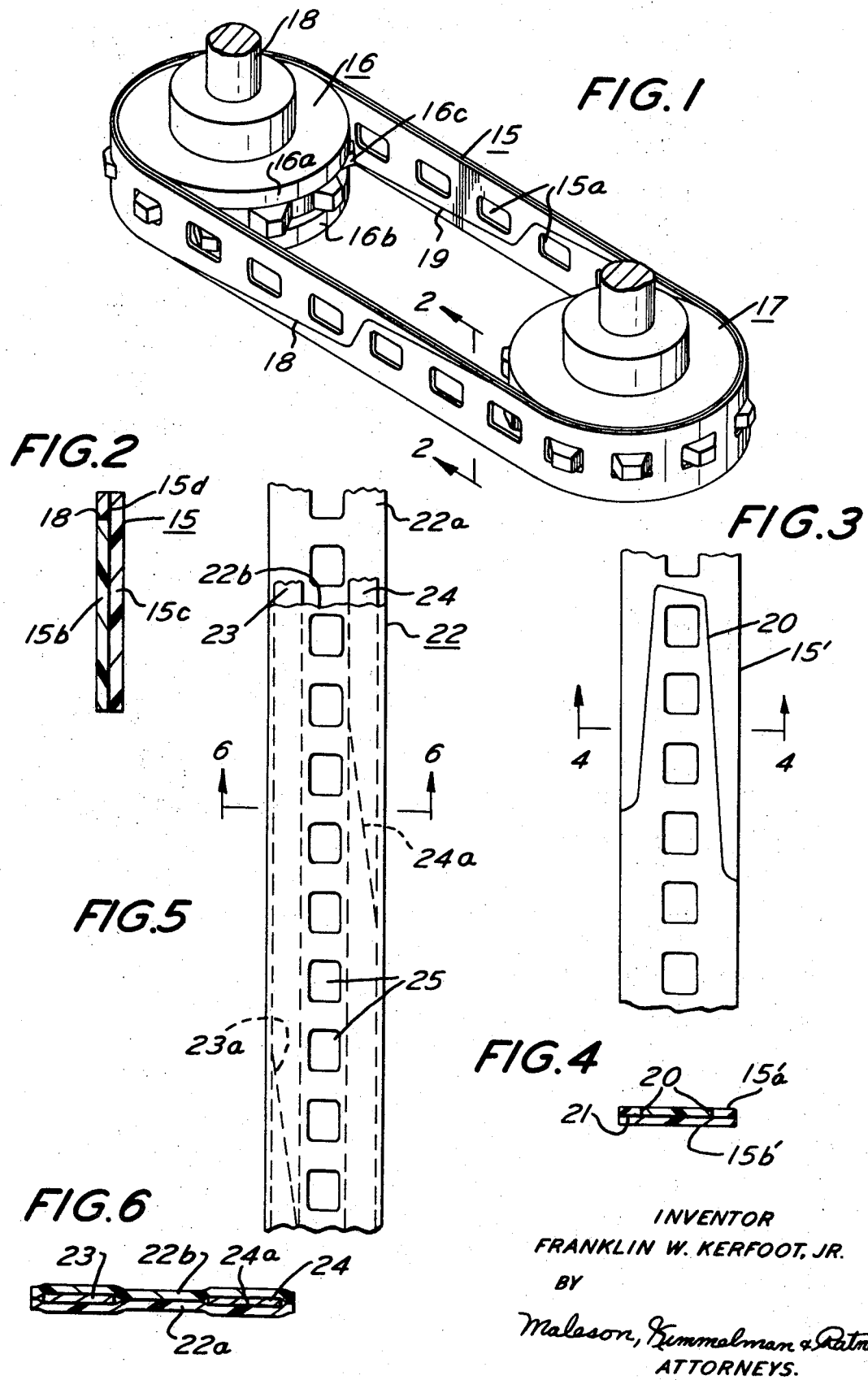

Patented May 4, 1971

INVENTOR
FRANKLIN W. KERFOOT, JR.

BY
Maleson, Kimmelman & Ratner
ATTORNEYS.

LAMINATED SPROCKET BELT

BACKGROUND OF THE INVENTION

1. Field of the Invention

This invention relates to laminated sprocket belts primarily designed for the transmission of power from one rotating member to another rotating member.

2. Prior Art

Sprocketed film and tape in finite lengths have been used for driving purposes with sprocket wheels. In a few known cases where they have been used as endless belts, power transmission has not been the objective. When they have been designed especially for transmission of power, endless belts with sprocket holes formed in them have usually been made of a single layer, the ends of the belts being joined by splicing them by various means including ultrasonic welding. The joints so made have been largely unsatisfactory for power transmission purposes because weakness or failures at the joints have arisen due to fatigue or because problems of unbalance of the belt occur due to the differences in the size of the section of the belt at these joints. Also, known belts are comparatively expensive to produce and there is a definite need for a belt which is susceptible of high-speed, low-cost production and on automatic equipment.

SUMMARY OF THE INVENTION

An endless belt consisting of two or more layers bonded together has a plurality of sprocket holes formed therein. Each layer has a butt joint which is spaced longitudinally from the joints of the other layers. In one form of the invention the length of the butt joints are at least twice the width of the belt. Other forms include the use of intermediate reinforcing bands, belts with greater thickness between sprocket holes, etc.

BRIEF DESCRIPTION OF THE DRAWINGS

FIG. 1 is a perspective view of one form of the laminated sprocket belt according to the present invention shown in a driving relation to two rotary members.

FIG. 2 is a sectional view of the novel belt shown in FIG. 1 taken along the section line 2-2 in the direction indicated.

FIG. 3 is a fragmentary side elevation view of another form of the laminated belt in accordance with the present invention.

FIG. 4 is a cross-sectional view of the belt shown in FIG. 3 taken along the section line 4-4 in the direction indicated.

FIG. 5 is a side elevational view of still another form of the present invention having parts broken away to show its internal construction.

FIG. 6 is a sectional view of the novel belt shown in FIG. 5 taken along the section line 6-6 in the direction indicated.

DETAILED DESCRIPTION OF THE DRAWINGS

Figure 7:
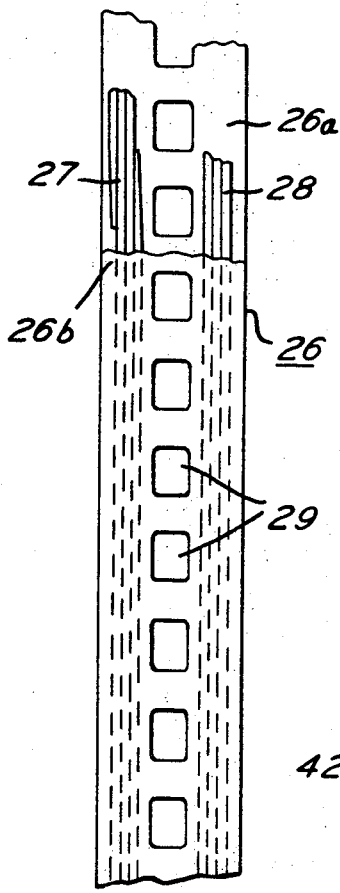
FIG. 7 is a side elevation view of still another form of the present invention with parts broken away to show interior construction.

Referring to FIG. 1 there is shown generally at the numeral 15 a sprocketed laminated belt which is disposed around two sprocket wheels 16 and 17. The wheel 16 has cylindrical portions 16a and 16b and includes standard involute spur gear 16c which is combined with the cylinders 16a and 16b as an integral unit on driving shaft 18. Similarly sprocket wheel 17 has the same general construction. It will be seen that the belt 15 includes a plurality of sprocket holes 15a.

As may be seen by inspection of FIG. 2, the belt 15 is of laminar construction having plastic layers 15b and 15c fused together under heat and pressure with an intermediate layer 15d of a polyester adhesive. Typical thickness of the polyester adhesive layer might be ½ to 1 mil. The plastic layers 15b and 15c could be made of polyester film and could each be, say, 5 mils thick.

As may be seen from FIG. 1 a joint 18 is formed in layer 15b. This joint 18 is preferably of a length which is considerably greater than the width of the belt. The length of these butt-end joints is made to give a long joint in shear and should preferably have a length which is twice the width of the tape. For maximum strength, the joint 18 should be spaced from the corresponding joint 19 formed in the inner layer 15c. The contours of joints 18 and 19 as shown are simply illustrations of one type of butt-end joint that helps to improve the tensile strength of the belt 15.

FIGS. 3 and 4 show another type of butt joint 20 formed in the belt 15' which also can be made of two layers 15'a and 15'b of polyester plastic with an intermediate layer 21 of polyester adhesive that fuses the layers together under heat and pressure. Of course, the belt 15' also includes another butt joint (not shown) in the other layer 15'b but spaced longitudinally from the joint 20.

For high-speed automatic manufacture it is desirable to punch and cut the individual layers 15b and 15c and 15'a and 15'b prior to bonding them together with an intermediate adhesive. The accurate close butting of ends and close matching of the centerlines of the sprocket holes can be made much easier during automatic assembly and bonding if the initial free pitch-line lengths and pitches of the sprocket holes of each of the layers are different from the final pitch-line L of the composite laminated belts 15 or 15'. For example, if layers 15b and 15c are each 5-mils thick, the initial length of the pitch line of inner layer 15c would be $L-0.005\pi$ whereas the initial length of the pitch line of outer layer 15b would be $L+0.005\pi$. If the final linear pitch of the sprocket holes of the final belt is to be P, the initial individual sprocket pitch of layer 15c would be $P(1-.005\pi)$ and the initial individual sprocket hole pitch of layer 15b would be $P(1+0.005)$.

While these initial modifications are helpful they are not essential and the belts can alternatively be made with layers of the same length and sprocket pitch or the sprocket holes can be punched after the layers are bonded together.

When it is desired to transmit more power, the belts can be reinforced with metallic ribbons such as ribbons of steel. For high-speed automated manufacture, one single turn of steel on each side of the sprocket holes as shown in FIG. 5 is preferred. In FIG. 5, the belt 22 has an inner layer 22a and an outer layer 22b with ribbons 23 and 24 of steel sandwiched between them. While the material of the layers 22a and 22b may be of any flexible material, they could be illustratively of polyester film ½-inch wide and 5-mils thick. These layers may be coated in advance with polyester adhesive and then subjected, after being placed in contact with one another and with the intermediate steel ribbons, to the bonding operation under heat and pressure. The ribbons 23 and 24 could each be, for example only, 1-mil thick by 100-mils wide and be made of hardened steel. The sprocket holes 25 could be 140-mils wide by a length somewhat greater than half of the selected pitch and preferably should have rounded corners as shown. The length of the butt joints 23a and 24a could be a minimum of 500 mils and preferably are even greater in length. Of course other contours of butt-end joints can be employed which have better characteristics for feeding into the automatic machinery that makes the composite belt. The butt joints of the layers 22a and 22b themselves will preferably be spaced from one another and from the joints 23a and 24a to ensure greater tensile strength.

FIG. 7 shows a form of reinforced belt 26 comprising plastic layers 26a and 26b between which on both sides of holes 29 are sandwiched two sets of reinforcing steel ribbons 27 and 28 which are each of multiturn construction. The overlap of the ends of each ribbon should be at least 10 times the width of each ribbon, the ribbon being, for example, 25-mils wide and 1-mil thick. The ends of the steel ribbons 27 and 28 may be tapered as shown or square, tapered ends being preferred for balanced weight and the square ends being preferred for easier automatic feeding through rolls, etc., during manufacture by automatic machinery. As in the previous embodiment, the overlap area of the joint of one reinforcing ribbon is spaced longitudinally from the overlap area of the other reinforcing ribbons, these overlap areas themselves also being spaced longitudinally from the overlap areas of the other plastic layers in the laminar construction. As in the form shown in FIG. 6, the inside surfaces of the layers 26a and 26b are precoated with a polyester adhesive material, for example, and then these two layers are pressed under heat and pressure with the reinforcing ribbons between them. Another variation (not shown) is to use, instead of reinforcing ribbons having a rectangular cross section, reinforcing metallic or nonmetallic turns of material having a circular cross section. The reinforcing material in the latter embodiment can either be monofilamentary or multifilamentary as desired.

Figure 8:
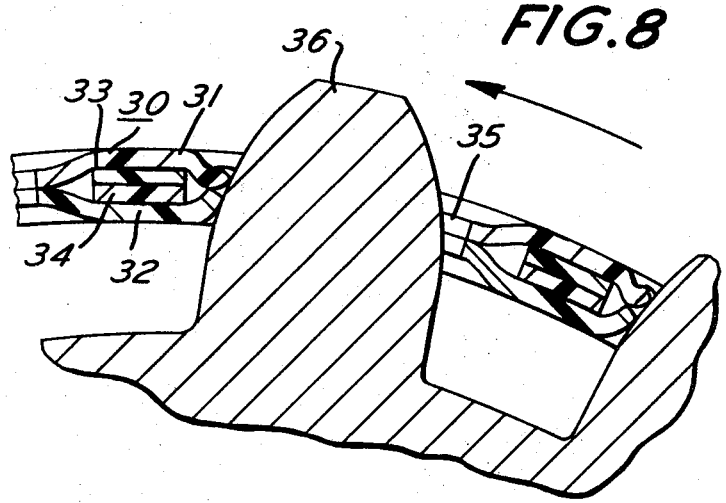
FIG. 8 is a longitudinal sectional view of still another form of the novel belt according to the present invention shown mounted on a typical sprocket wheel.

Under certain conditions of load, material of the gear teeth, and other constructional features, the strength and abrasion resistance of the areas of the layers between the sprocket holes requires special design consideration. This may be appreciated by referring to FIGS. 8 and 9. In both of these FIGS., instead of two plastic layers with reinforcing ribbons of metal between them, there are four plastic layers. Thus, the belt 30 has two external layers 31 and 32 polyurethane, for example, which are 5-mils thick and ½-inch wide and whose inner surfaces are precoated with a layer of synthetic rubber adhesive of 1-mil thickness. These polyurethane ribbons are bonded to the polyester plastic layers 33 and 34 whose adjacent faces are precoated with a layer of polyester adhesive, such as DuPont Adhesive 046971, having a thickness of ½ to 1 mil. This type of belt may use the steel reinforcing ribbons if desired. The sprocket holes 35 may be enlarged to allow the closing and bonding of the outer layers 31 and 32 to each other around the edges of the sprocket holes. As shown in FIG. 8, the gear teeth 36 press against the edges of the sprocket holes 35 causing the layers 31 and 32 in the region of contact to be bent upward. If other gear teeth engage the sprocket holes 35 from above, they will press against the opposite bonded edges of the layers 31 and 32 and tend to bend them downward. Both types of gears may be used simultaneously on opposite faces of the belt 30.

Figure 9:
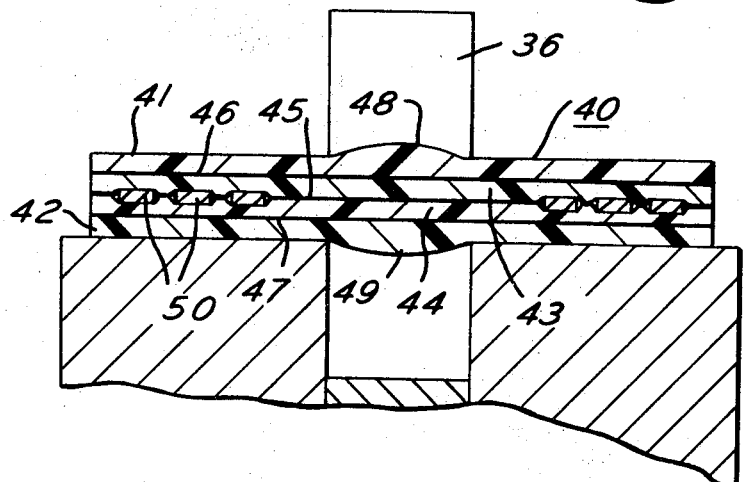
FIG. 9 is a transverse sectional view of still another form of the present invention as shown mounted on a sprocket wheel assembly.

FIG. 9 shows an alternate construction for the belt 40 using additional wear-resistant layers. In this case, the belt is of uneven thickness. It includes upper and lower wear-resistant layers 41 and 42 made of polyurethane or other plastic whose inner faces are coated with a synthetic rubber adhesive as was the belt 30 in FIG. 8. Layers 46 and 47 will be formed of the synthetic rubber adhesive as shown. The inner layers 43 and 44 may be of polyester and have their adjacent faces coated with a polyester adhesive to form a contact layer 45 when all of the layers are bonded together under heat and pressure. In the middle of the belt 40 between the sprocket holes the thickness of the polyurethane layers are increased to form two humps 48 and 49. These humps allow increased contact areas to be formed between the edges of the gear teeth and belt and also serve to strengthen the belt between the sprocket holes. The butt joints between the ends of these layers and between the ends of the other plastic layers and of the reinforcing metallic ribbons 50 may be made as previously explained.

Figure 10:
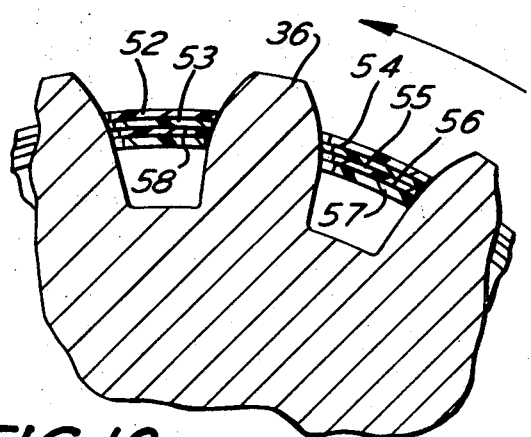
FIG. 10 is a longitudinal sectional view of still another form of the present invention shown mounted on a typical sprocket wheel assembly.

FIG. 10 shows another form of the invention wherein the lengths of the sprocket holes in the successive layers 52, 53, 55 and 57 increase from the outermost to the innermost layer. The center points of the lengths of the sprocket holes are kept in alignment, however. The layers may be made of the same materials as the layers (apart from the reinforcing bands) shown in FIG. 9. Similarly, the adhesive layers 54, 56 and 58 may be identical to the corresponding ones in FIG. 9. The increasing lengths of the sprocket holes results in tapered longitudinal sides of the holes which therefore is more contoured to the driving edges of the sprocket wheel. Consequently, there is a greater area of contact between the edges of the teeth and the belt.

Still other modifications and embodiments of the invention which do not depart from the essence thereof will occur to one skilled in the art upon reading the above specification in conjunction with the drawings herein. Consequently, it is desired that the invention be limited solely by the claims herein.

I claim:
1. An endless belt which comprises:
    a. at least two layers bonded together, the ends of each of said layers being disposed in proximity to one another to form a butt joint, the joint of one layer being spaced longitudinally of said belt from the joint of at least one of the other layers; and
    b. a plurality of sprocket holes formed in said layers, said butt joint passing between adjacent ones of said sprocket holes in the respective layers.
2. The endless belt according to claim 1 wherein the length of said butt joints is at least twice the width of the layer in which it is formed.
3. The endless belt according to claim 1 wherein the free pitch-line lengths of the individual layers are different from the composite pitch-line length of the belt.
4. The endless belt according to claim 3 wherein the linear pitch of the sprocket holes of the composite belt is different from the pitch of the sprocket holes of each individual layer.
5. An endless belt which comprises:
    a. at least two layers bonded together, the ends of each of said layers being disposed in proximity to one another to form a butt joint, the joint of one layer being spaced longitudinally of said belt from the joint of at least one of the other layers, and
    b. a plurality of sprocket holes formed in said layers, the length of the sprocket holes formed in an outer layer being smaller than the length of the sprocket holes of an inner layer and the longitudinal centers of said sprocket holes of the respective layers are substantially aligned with one another.
6. An endless belt which comprises:
    a. at least two layers bonded together, the ends of each of said layers being disposed in proximity to one another to form a butt joint, the joint of one layer being spaced longitudinally of said belt from the joint of at least one of the other layers and
    b. a plurality of sprocket holes formed in said layers, and
    c. at least two additional sprocket holed layers, each of which is disposed on the exposed external surface of respective ones of said two bonded layers, said additional layers being arranged to make contact with one another through portions of the sprocket holes in said first two layers, said contacting portions being located at least on the sides of said sprocket holes which normally are pressed against by the edges of the teeth of an associated sprocket in driving said belt in either direction.
7. The endless belt according to claim 22 wherein said two additional layers overlay each side of said two layers, said additional layers being arranged to contact one another on all sides of the sprocket holes of said two layers which they overlap.